United States Patent [19]

Hirbod

[11] 4,215,878

[45] Aug. 5, 1980

[54] BUMPER-AIR BAG

[76] Inventor: Farrokh Hirbod, 149 N. Rexford Dr., Beverly Hills, Calif. 90210

[21] Appl. No.: 904,134

[22] Filed: May 8, 1978

[51] Int. Cl.[2] .............................................. B60R 21/08

[52] U.S. Cl. ...................................... 280/737; 180/274

[58] Field of Search ............... 280/728, 729, 734, 736, 280/737, 741, 743; 293/60, 1, 71 P; 180/91, 103

[56] References Cited

U.S. PATENT DOCUMENTS

| | | | |
|---|---|---|---|
| 1,784,387 | 12/1930 | Pastal | 293/1 |
| 3,656,791 | 4/1972 | Truesdell | 293/1 |
| 3,856,326 | 12/1974 | Lindbert et al. | 180/91 X |
| 3,862,669 | 1/1975 | Lindbert et al. | 180/91 |
| 3,927,901 | 12/1975 | Weman | 293/71 P |

*Primary Examiner*—Robert B. Reeves

*Assistant Examiner*—Gene A. Church

*Attorney, Agent, or Firm*—Nilsson, Robbins, Dalgarn, Berliner, Carson & Wurst

[57] ABSTRACT

In a vehicle, a bumper-air bag system has a resilient bumper with a quantity of compressed gas therein. The resilient bumper is attached to one or more valve assemblies which have an enclosed air-tight region defined by a pair of cylindrical members. A valve inside the enclosed region is mechanically opened by movement of one of the members relative to the other in response to an impact on the bumper. Compressed gas, stored in the enclosed region, the resilient bumper, or both, is released into a passageway, connected directly to one or more air bags, to inflate the air bags when the valve is opened.

14 Claims, 4 Drawing Figures

BUMPER-AIR BAG

BACKGROUND OF THE INVENTION

The present invention relates to safety equipment for vehicles and, in particular, to a bumper-air bag system which automatically causes air bags in the interior of the vehicle to inflate upon an impact upon one of the bumpers of the vehicle.

Various safety apparatus have been provided on vehicles which automatically activate upon impact of a front bumper. For example, in U.S. Pat. No. 1,784,387, a rubberized bumper tube was provided filled with oil which was directly connected to a brake apparatus whereby the brakes were applied automatically when a front bumper was impacted. Although the present invention incorporates a rubberized or flexible front bumper, the safety device of the present invention causes air bags to inflate and the valve system which causes inflation is entirely different.

In U.S. Pat. No. 3,656,791, an air bag system is disclosed. However, in that patent, the air bag is attached to the front bumper and is provided to protect the vehicle upon an impact and not the passengers in the interior. Thus, no air passageways are shown or needed and the required valve which opens to cause the bag to inflate is entirely different and requires, in addition to opening a valve, that the exterior chamber holding the bag be ruptured.

In U.S. Pat. No. 3,862,669, patented Jan. 28, 1975, and 3,922,002, patented Nov. 25, 1975, occupant restraint systems are shown utilizing air bags in the interior of an automobile with an air passageway coupled to the air bag and compressed air released into the passageway when a valve is released due to the impact on the bumper. However, the bumper apparatus is not resilient and does not contain compressed gas and, further, the valve apparatus shown are destructive requiring the piercing of a diaphragm as a single cylinder collapses in response to an impact.

By contrast, the present invention incorporates a pair of cylinders connected between the bumper and the frame of the vehicle having two cylindrical members defining an air-tight enclosure with a non-destructive valve in the interior so that as one cylinder moves relative to the other, a valve is mechanically opened releasing compressed gas to inflate the air bags in the interior of the vehicle.

Finally, in U.S. Pat. No. 3,927,901, a continuous pressurized air tank is provided, a portion of which is a front bumper with a valve placed between the pressurized gas tank and an air bag in the interior of the car. The valve is actuated by an increase in air pressure caused by an impact on the front bumper resulting in the inflation of the air bags in the interior of the vehicle.

By contrast, the present invention does not require a valve between the air bag and the branch section connecting the interior of the vehicle with the front bumper and, further, has a mechanical valve which is actuated in response to physical movement of the bumper rather than an increase in air pressure within a pressurized gas tank.

SUMMARY OF THE INVENTION

A bumper-air bag system for inflating at least one air bag upon releasing a quantity of compressed gas for use in a vehicle is provided in accordance with the present invention having a resilient bumper means and a non-destructive, mechanically actuated valve means which is actuated in response to movement of the resilient bumper for releasing the quantity of compressed gas through the valve means. A means defining a passageway connected between one or more air bags and the valve means for directing the compressed gas released through the valve means to inflate the air bag. Thus, the air bag is inflated by the compressed gas when the valve means is non-destructively and mechanically actuated in response to an impact upon the resilient bumper means.

More specifically, the resilient bumper means which may be positioned on the front, back or sides of a vehicle is preferably a rubberized or flexible bumper tube containing pressurized gas to absorb impacts. The valve means generally comprises one or more valve assemblies, each of which has a first member which is fixed to the vehicle frame and a second member which is fixed to the resilient bumper so that the second member is movable relative to the first member in response to the mechanical compression of the resilient bumper. The first member and the second member are preferably cylindrical in shape and define an air-tight enclosure. The non-destructive valve positioned in the enclosure incorporates a pivot member or arm which is positioned for engagement and rotation by an edge of the second member when the second member is compressed relative to the first member. As one end of the pivot arm is pressed down when engaged by the second member, the other end engages the edge of a valve plate positioned over an orifice defining the commencement of the passageway to thereby lift the plate from the orifice. While one such pivot member is sufficient, it will be appreciated that several such pivot members may simultaneously cause the valve plate to be lifted from the passageway orifice.

The source of compressed gas utilized to inflate the air bag in the interior of the vehicle may be confined and stored in the resilient bumper means, in the enclosure defined by the first member and the second member of the valve apparatus or in a combination of the two. For example, in one embodiment, each valve assembly may be connected directly to the resilient bumper means with no means provided for a transfer of compressed gas between the resilient bumper means and the enclosure defined by the valve assembly. In this case, the compressed gas utilized to inflate the air bags is entirely stored in the valve assembly enclosure.

In a second embodiment, the valve is again attached directly to the resilient bumper means, but with a passageway provided to allow the free flow of gas between the resilient bumper means and the enclosure defined by the valve assembly.

In a third embodiment, a passageway is again provided between the enclosure of the valve assembly and the interior of the resilient bumper. However, a diaphragm is placed across the passageway to prevent gas from passing between the two regions. Thus, the compressed gas utilized to inflate the air bags in the interior of the vehicle may be contained entirely in the resilient bumper means. When the resilient bumper means is impacted with sufficient force, the diaphragm ruptures allowing air to pass into the valve enclosure. The air then passes into the passageway to inflate the air bags, provided the mechanically actuated valve has opened. In the latter system, the seal providing the air tight coupling between the first cylindrical member and the second cylindrical member of the valve assembly does not neet to be as tight as in other embodiment since compressed gas is not being continuously contained in the valve assembly enclosure. Since seals would be less expensive, the system would also be less expensive.

The air bags may be stored in compartments in the dashboard and in the center of the steering wheel in the interior of the vehicle. Alternatively, the air bags, which may be retained in the rear portion of the front seat to protect rear seat occupants, can be held in place by press fitting the air bags into moldings positioned across the entire dashboard (or rear part of the front seat) and around the various instruments. In that configuration, the pre-inflated air bag is exposed to provide a cushion for the dashboard (or rear part of the front seat).

Finally, the flexible bumper means may incorporate a rigid metal or steel bumper to protect the flexible or rubberized bumper tube from being punctured or otherwise damaged by minor impacts as well as to distribute the effects of an impact.

BRIEF DESCRIPTION OF THE DRAWINGS

The present invention will be better understood from the detailed description below taken in conjunction with the drawings wherein like reference character refer to like parts throughout and in which.

DETAILED DESCRIPTION OF THE PREFERRED EMBODIMENTS

The bumper-air bag system of the present invention comprises one or more valve assemblies coupled between the frame of the vehicle and a resilient bumper apparatus. The valve assembly is positioned to release a quantity of compressed gas into a passageway system which is connected directly to one or more air bags. Thus, when the resilient bumper apparatus is compressed, the valve opens releasing the compressed gas into the passageway to cause the air bags to inflate.

Figure 1:
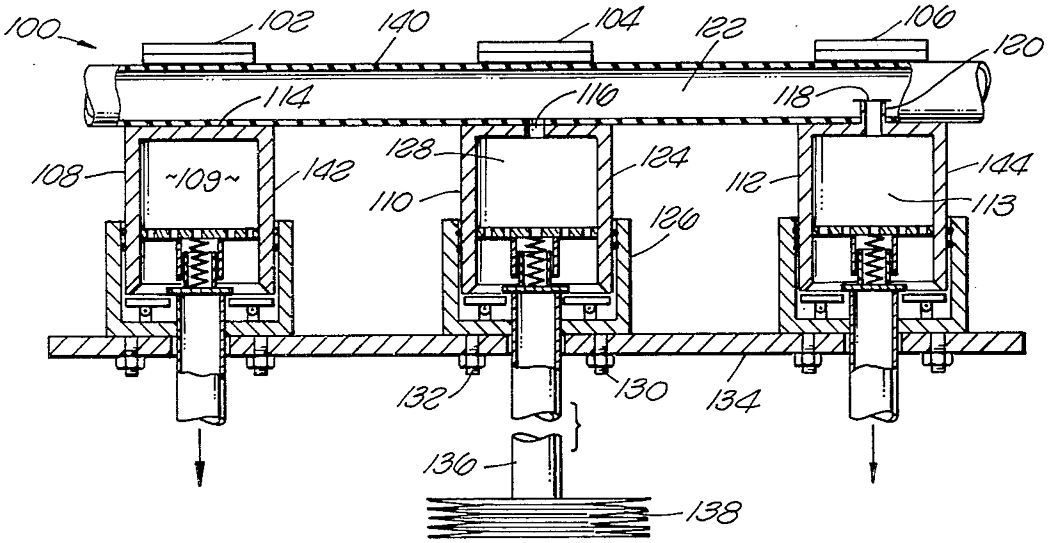
FIG. 1 is a plan, cross-sectional view showing the particular details of the present invention.
Figure 3:
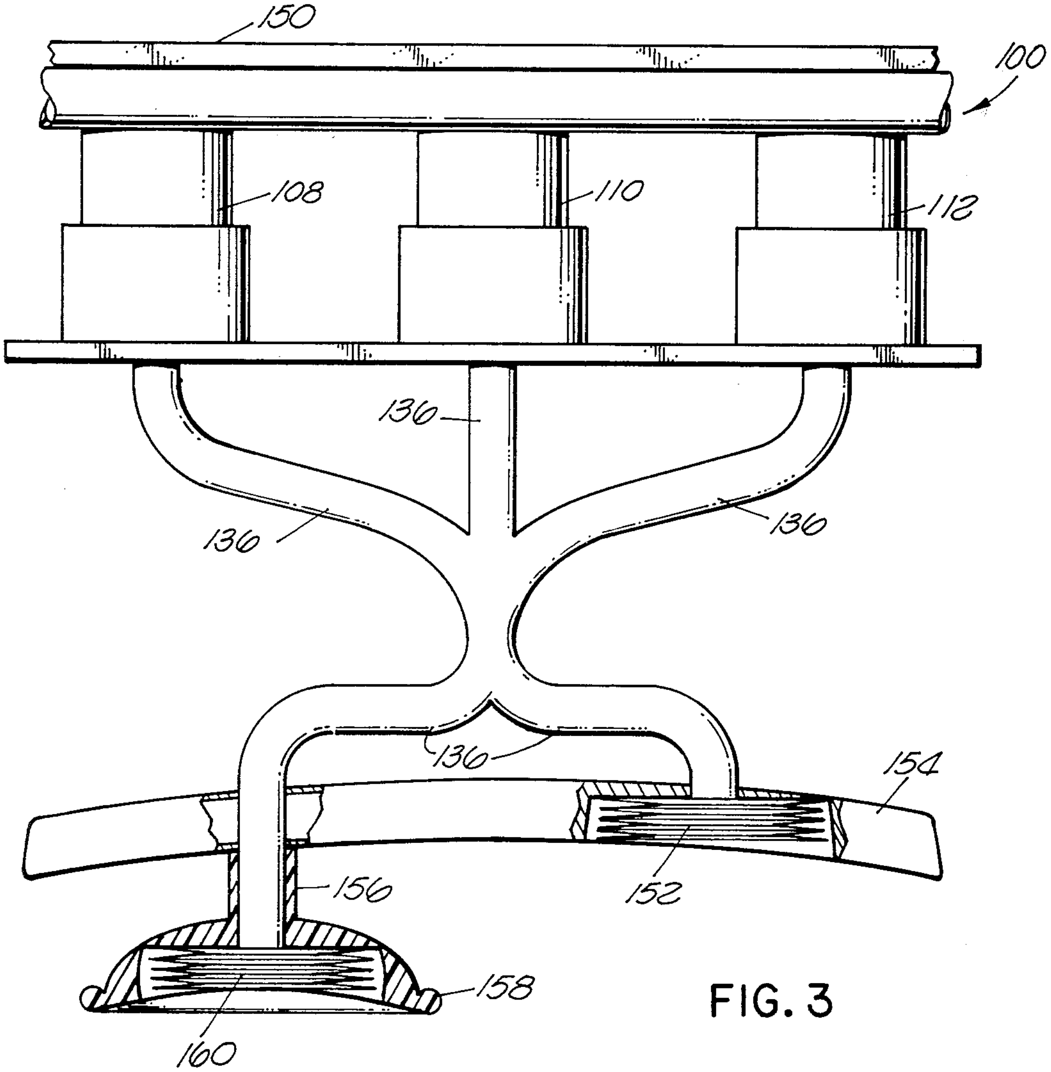
FIG. 3 is a schematic diagram in plan view of the present invention showing the resilient front bumper with a passageway coupled between air bags stored in compartments in the steering wheel and dashboard in the interior of a vehicle, and the valve assemblies connected to the resilient bumper apparatus.

Referring first to FIG. 1, a resilient means 100 preferably has an enclosed interior region 122 containing a compressed gas which may be air. In one embodiment, the compressed gas has a pressure of about 50 to 60 pounds per square inch. The resilient means may comprise a continuous flexible member 140 which has a front region onto which are fixed one or more rigid bumper members 102, 104 and 106. The continuous flexible member 140, in the interior of which is the compressed gas, may be made of rubber or may be made in a similar fashion to a tire to be strong but flexible. Thus, if an impact occurs, the compressed gas in the resilient member will compress further thereby absorbing engergy from the impact and preventing damage in minor impacts or bumps. The rigid bumper members 102, 104 and 106 or, as shown in FIG. 3, a continuous bumper member 150, provide additional protection to prevent the flexible member 100 from being inadvertently punctured or damaged as well as providing a means of distributing the force of an impact.

Coupled between a frame 134 and the resilient bumper apparatus 100 is one or more valve apparatus. For example, in FIG. 1, three valve apparatus 108, 110 and 112 are spaced across the front of the vehicle and attached between the frame member 134 and the resilient bumper apparatus 100.

The valve apparatus may be attached to the resilient bumper means in any one of several ways. For example, the valve 108 is shown coupled or fixed to the resilient bumper apparatus 100 by a gas impenetrable end portion 114 so that when the resilient bumper apparatus is impacted, a member 142 of the valve assembly 108 moves rearward in the direction of the impact to mechanically actuate a valve. In this embodiment, the compressed gas utilized to inflate the bumper-air bags may be contained in the interior volume or enclosure 109 of the valve 108.

A second structure for coupling the resilient bumper apparatus 100 to a valve comprises a valve member 124 fixed at one of its ends to the flexible member 140 with a passageway 116 provided between the interior of the continuous flexible member 140 and the valve enclosure 128. The volume enclosed by the continuous flexible member 140 and the valve enclosure 128 define a continuous volume wherein the compressed gas utilized may be contained.

A third structure which may be utilized to couple a valve to the continuous flexible member 140 is illustrated by the valve apparatus 112 in FIG. 1. In a manner similar to that described in conjunction with the valve 110, the valve 112 also provides a member 144 having one end fixed to the continuous flexible member 140 with a passageway 120 between the interior of the member 140 and the interior volume 113 of the valve 112. However, in this embodiment, a diaphragm 118 is provided across the orifice of the passageway 120 to prevent a flow of gas between the continuous flexible member 140 and the interior of the valve apparatus 112. The diaphragm is chosen to be sufficiently strong to withstand the ambient pressure in the resilient member but sufficiently weak to fail when the pressure exceeds, for example, 100 pounds per square inch. Thus, the increased pressure due to an impact on the front of the resilient bumper apparatus will cause the diaphragm 118 to burst releasing the compressed gas in the interior of the continuous flexible member 140 into the enclosure 113. If the valve in the interior of the valve apparatus 12 has been mechanically opened by compression of the member 144, the compressed gas from the interior of the continuous flexible member 140 passes through the enclosure 113 and into the passageway means 136 to inflate the air bags.

Each valve apparatus may be illustrated by reference to the valve 110 in FIG. 1 which generally comprises a first member 126 which is fixed to the frame 134 of the vehicle by the bolts 130 and 132, and a second member 124 which is movable relative to the first member 126 in response to compression of the resilient bumper means 140. The members 124 and 125 are preferably cylindrically shaped and define an enclosed volume 128 capable of containing compressed gas for at least a short period of time. If the compression movement of the second member 124 towards the first member 126 is sufficiently great, the second member 124 will mechanically open a valve between the enclosed volume 128 in the valve and the air passageways 136, thus causing the compressed gas to inflate one or more air bags 138 in the interior of the vehicle.

Figure 2:
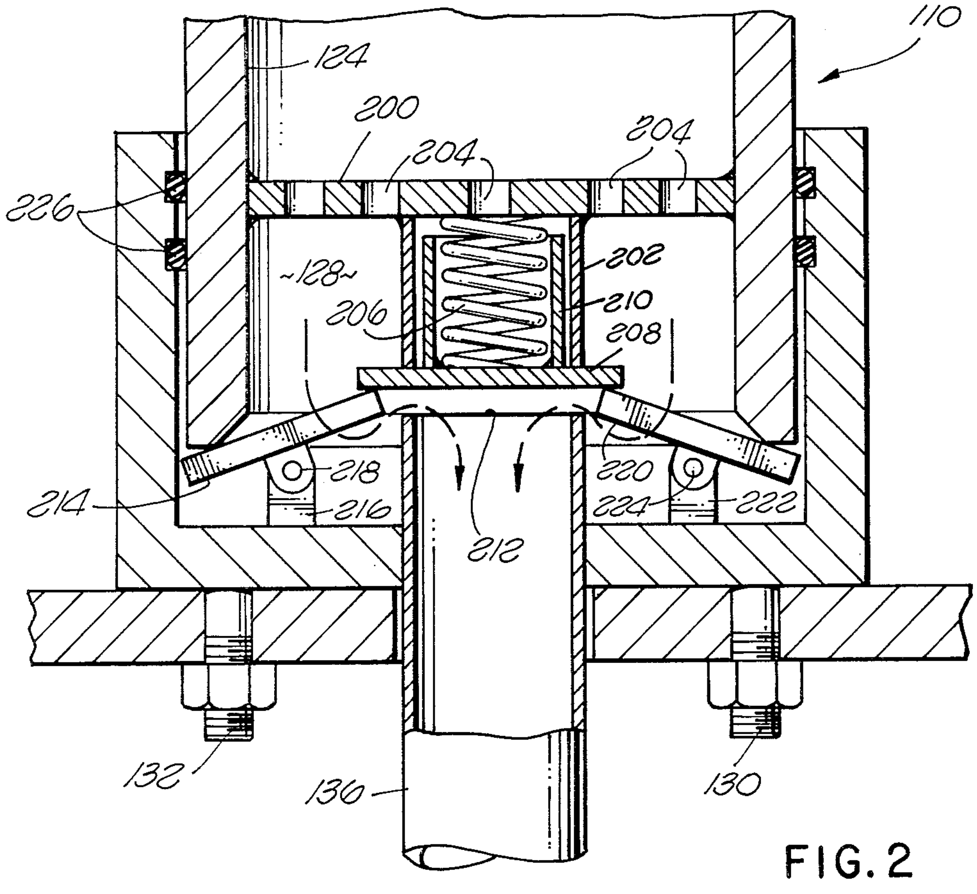
FIG. 2 is a plan, cross-sectional detail of one valve assembly illustrating the particular butterfly valve plate of the present invention with the valve in the opened position.

Referring to the representative valve assembly 110 shown in FIG. 2 is in an opened state for allowing gas to pass from the enclosed region 128 into the gas passageway 136. More specifically, a cross-support member 200 is fixed to the second member 124 and has, for example, passageways 204 through the support member 200 so that gas may freely flow therethrough. Fixed to the support member 200 and extending generally perpendicular therefrom and parallel to the surface of the second member 124 is a guide member 202 which may, for example, by a cylinder or other guide means. The valve comprises a plate 208 which normally fits over the orifice 212 of the passageway 136 to prevent the compressed gas from flowing into the passageway 136 when the plate 208 is in place. Extending perpendicular to the plate 208 is a second guide member 210 which may also be a cylinder of a smaller diameter than the cylinder 202 so as to freely move longitudinally within the cylinder 202.

A spring 206 is placed in the interior of the region defined by the guide members 202 and 210 to thereby hold the plate 208 against the orifice 212 when the valve is closed. In order to lift the plate 208 from the orifice 212, one or more butterfly apparatus provide an upward lifting force on the edges of the plate 208 in response to movement of the second member 124. For example, a left butterfly apparatus may comprise a lifting or pivot member 214 which is pivotally attached to a support member 216 by a hinge or other pivot apparatus 218. A second butterfly type valve on the opposite side of the plate 208 has a similar lifting or pivot member 220 pivotally attached to a support member 222 by a hinge or other pivot apparatus 224.

Referring particularly to the left butterfly apparatus, when an impact occurs, the second member 124 attached to the resilient bumper apparatus is mechanically moved towards the rear to engage and push down one edge of the pivot member 214 thereby rotating the pivot member 214 about the pivot joint or hinge 218. The opposite edge of the pivot member 214 pushes against the edge of the plate 208 thereby lifting that edge from the orifice 212 allowing gas to flow into the passageway 136. In a similar manner, the pivot member 220 lifts the opposite edge of the valve plate 208 as the second member 124 is compressed. The valve apparatus may be provided with a latch means (not shown) whereby the second member 124 will not return to an uncompressed state causing the valve to close until a sufficient period of time has elapsed to allow the air bags to inflate.

A seal 226 is also provided between the first member 126 and the second member 124 to prevent compressed gas, which may be contained in the interior of the valve, from being dissipated.

Referring now to FIG. 3, the overall bumper-air bag system of the present invention is illustrated showing the resilient bumper means 100 with a continuous single rigid front bumper member 150, and three valve assemblies 108, 110 and 112. The respective valves are coupled by the passageway 136 to the air bags 152 and 160 in the interior of the vehicle. The air bag 152 is folded accordian style and packed in a chamber provided in the dashboard 154. The second air bag 160 is also folded accordian style and packed in compact fashion in a chamber provided in the steering wheel 158. The air passageway apparatus 136 then connects continuously to the air bag 160 (through the steering column 156) and to the air bag 152 without the necessity of a valve between each air bag and the passageway 136.

Figure 4:
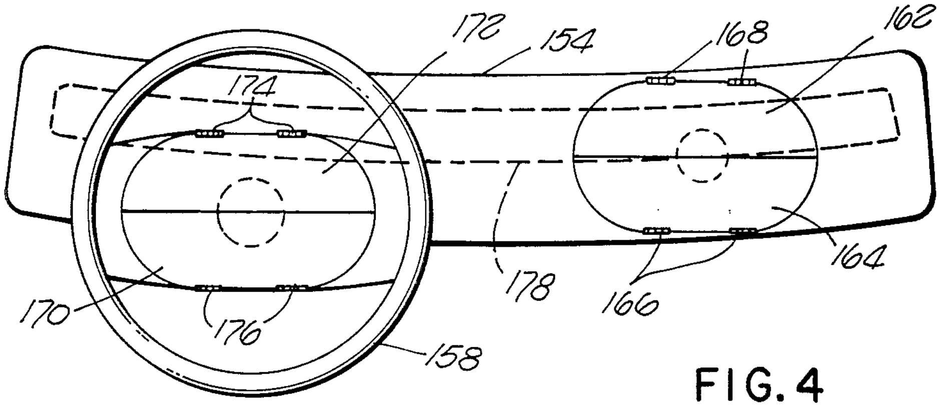
FIG. 4 shows an elevational, schematic diagram of a dashboard showing a hidden compartment in the dashboard and a hidden compartment in the steering wheel for containing the air bags when uninflated.

Referring now to FIG. 4, there is shown a front view of the dashboard of a vehicle illustrating how the compartments in which the air bags are stored may be positioned and configured. Thus, a compartment may be provided in the dashboard 154 for containing a folded air bag behind a pair of doors 162 and 164 hinged by the hinges 168 and 166 and latched to hide and confine the folded air bag. When the air bag inflates, the pressure from the air bag causes the doors 162 and 164 to open allowing the inflated air bag to extend into the interior of the vehicle.

In a similar fashion, the container for holding the air bag 160 in the steering wheel 158 may have first and second doors 170 and 172 hinged respectively by the hinges 176 and 174. The doors 170 and 172 may also be latched to confine the air bag 160, but which automatically unlatch and release the air bag 160 into the interior of the vehicle when the air bag 160 is caused to inflate.

Alternatively, an air bag 178 may be positioned across the entire dashboard 154, as illustrated by the dashed line in FIG. 4, with instruments being avoided by folding the air bag around the instruments. The bag may be retained on the dashboard utilizing a retaining premolded molding into which the air bag is press fitted. In such a configuration, the air bag 178 may act as a cushion in minor impacts prior to being inflated. The air bag 178 in such a configuration may, for example, be retained by a V-groove molding or by an adhesive. It will, of course, be appreciated that an air bag may also be similarly positioned on the rear part of the front seat to provide protection for occupants in the back seat of the vehicle. In that instance, the air bag may be made an integral part of the front seat.

Of course, it will be appreciated that, while particular apparatus for containing the air bags in the interior of the vehicle have been described, various other apparatus may be utilized for not only containing the air bags but hiding the air bags in compartments in the interior of the vehicle. In addition, while the above invention has been described as utilizing two butterfly mechanisms for each valve, it will be appreciated that the plate 208 in the valve shown in FIG. 2 may be hinged to one side of the passageway orifice 212 with the plate 208 being lifted at only one edge by a single butterfly mechanism.

Since certain other changes may be made in the foregoing disclosure without departing from the scope of the present invention, it is intended that all matter contained in the above description and depicted in the accompanying drawings be construed in an illustrative and not a limiting sense.

What is claimed is:

1. A bumper-air bag system for inflating at least one air bag in a vehicle having a rigid frame upon releasing a quantity of compressed gas, said system comprising:

bumper means;

non-destructive mechanically actuated valve means adapted to be actuated in response to movement of the bumper means for releasing the quantity of compressed gas therethrough; and, means defining a passageway for directing the compressed gas released through the valve means to the at least one air bag;

said valve means comprising:

a first member fixed to the rigid frame;

a second member movable relative to the first member in response to compression of the bumper means, the first member and the second member defining a valve enclosure from which the quantity of compressed gas flows when the valve means is actuated;

first coupling means for attaching the second member to the bumper means; and, second coupling means for attaching the first member to the passageway means.

2. The bumper-air bag system of claim 1 wherein the first coupling means comprises a gas impenetrable end portion of the second member fixed to the bumper means, the gas impenetrable end portion preventing the flow of gas between the valve enclosure and the bumper means, the quantity of compressed gas being contained in the valve enclosure.

3. The bumper-air bag system of claim 1 wherein the bumper means comprises a flexible member for containing pressurized gas therein.

4. The bumper-air bag system of claim 5 wherein each of the valve assemblies further comprises:

at least one pivot member positioned for being rotated by an edge portion of the second member when the second member moves more than a defined amount in response to compression of the bumper means; and a valve plate positioned over an orifice defining the commencement of the passageway means and having an edge region positioned for being lifted from the orifice when the pivot members are rotated by the edge portion of the second member.

5. The bumper-air bag system of claim 3 wherein the compressed gas is contained in the flexible member and the first coupling means comprising:

an end portion of the second member fixed to the flexible member, the end portion and the flexible member having a passageway therethrough; and a diaphragm positioned in the passageway, the strength of the diaphragm being sufficiently small so that the diaphragm bursts for releasing the compressed gas from the flexible member into the valve enclosure upon a sudden impact on the bumper means.

6. The bumper-air bag system of claim 4 wherein the first coupling means comprises an end portion of the second member fixed to the flexible member, the end portion and the flexible member having a passageway therethrough defining a continuous volume including the valve enclosure and the interior of the flexible enclosure member, the continuous volume containing the quantity of compressed gas therein.

7. The bumper-air bag system of claim 1 further comprising air bag means which comprises at least one air bag in a compactly folded configuration prior to inflation, means for attaching the air bag to a first portion of the vehicle in front of the location in the vehicle where occupants reside, the air bag providing protective padding for the first portion of the vehicle prior to inflation.

8. The bumper-air bag system of claim 1 wherein the bumper means comprises a flexible member and at least one rigid bumper member fixed thereto for protecting the flexible member when an impact occurs.

9. A bumper-air bag system for inflating at least one air bag in a vehicle having a rigid frame upon releasing a quantity of compressed gas, said system comprising:

bumper means;

non-destructive mechanically actuated valve means adopted to be actuated in response to movement of the bumper means for releasing the quantity of compressed gas therethrough;

means defining a passageway for directing the compressed gas released through the valve means to the at least one air bag;

a compartment means for containing the at least one air bag in a compactly folded configuration under quiescent conditions and releasing the air bag when the quantity of compressed gas is released through the valve means; and, a steering wheel, at least one of the compartment means being positioned in the steering wheel.

10. The bumper-air bag system of claim 9 wherein the vehicle has a dashboard, at least one of the compartment means being positioned in the dashboard.

11. The bumper-air bag system for inflating air bags with a quantity of compressed gas for use in a vehicle having a rigid frame, comprising:

an defining a resilient means enclosure;

at least one rigid bumper member fixed to the resilient means for maintaining the integrity of the resilient means upon impact;

valve means mechanically actuated in response to movement of the resilient means for releasing the quantity of compressed gas, the valve means comprising:

a first member fixed to the frame;

a second member movable relative to the first member in response to movement of the resilient means, the first member and the second member defining a valve enclosure;

at least one pivot member positioned for engagement and rotation by the second member when the second member moves a predetermined distance in response to movement of the resilient means;

a valve plate positioned over an orifice, said valve plate having an edge portion positioned for engagement by the pivot member, said valve plate being adapted to be lifted from said orifice when the pivot member is rotated by the second member, means defining a passageway having a first end connected to the air bags and a second end connected to the valve means at the orifice thereof;

means for releasably retaining a quantity of compressed gas between the resilient means and the valve plate; and means for attaching the second member to the resilient means.

12. The bumper-air bag system of claim 11 wherein the attachment means comprises a gas-impenetrable end portion of the second member fixed to the resilient means, the gas-impenetrable end portion preventing the flow of gas between the valve enclosure and the resilient enclosure means enclosure.

13. The bumper-air bag system of claim 11 wherein the resilient means contains pressurized gas and the attaching means comprises:

an end portion of the second member fixed to the resilient means, the end portion and the resilient means having a passageway therebetween; and a diaphragm positioned in the passageway, the strength of the diaphragm being such that the diaphragm bursts releasing the compressed gas from the resilient means enclosure to the valve enclosure upon a sudden impact.

14. The bumper-air bag system of claim 11 wherein the attaching means comprises an end portion of the second member fixed to the resilient means, the end portion and the resilient means having a passageway therebetween defining a continuous volume including the valve enclosure and the resilient means enclosure.

* * * * *

UNITED STATES PATENT AND TRADEMARK OFFICE

CERTIFICATE OF CORRECTION

PATENT NO. : 4,215,878

DATED : August 5, 1980

INVENTOR(S) : FARROKH HIRBOD

It is certified that error appears in the above-identified patent and that said Letters Patent are hereby corrected as shown below:

| Column | Line | Correction |
|---|---|---|
| 3 | 26 | "character" should read --characters--. |
| 4 | 54 | "12" should read --112--. |
| 5 | 18 | "by" should read --be--. |
| 7 | 26 | "5" should be --3--. |
| 7 | 40 | "comprising" should read --comprises--. |
| 8 | 25 | "an defining a resilient means enclosure;" should read --resilient means defining an enclosure;--. |
| 8 | 42 | add and, after the word "means;" |

Signed and Sealed this

*Thirteenth* Day of *January 1981*

[SEAL]

*Attest:*

SIDNEY A. DIAMOND

*Attesting Officer* *Commissioner of Patents and Trademarks*

UNITED STATES PATENT AND TRADEMARK OFFICE

CERTIFICATE OF CORRECTION

PATENT NO. : 4,215,878

DATED : August 5, 1980

INVENTOR(S) : FARROKH HIRBOD

It is certified that error appears in the above-identified patent and that said Letters Patent are hereby corrected as shown below:

| Column | Line | Correction |
|---|---|---|
| 8 | 61 | delete "enclosure;". |
| 8 | 62 | After the word "means", delete "enclosure". |

Signed and Sealed this

*Tenth* Day of *March 1981*

[SEAL]

*Attest:*

RENE D. TEGTMEYER

*Attesting Officer* *Acting Commissioner of Patents and Trademarks*